(12) United States Patent
Adam et al.

(10) Patent No.: US 6,781,984 B1
(45) Date of Patent: Aug. 24, 2004

(54) TECHNIQUES AND ARCHITECTURES FOR IMPLEMENTING A DATA SKEW EQUALIZER FOR DATA ALIGNMENT IN A DISTRIBUTED SYSTEM

(75) Inventors: Joel F. Adam, Cupertino, CA (US); Darren Engelkemier, Moutain View, CA (US)

(73) Assignee: Ciena Corporation, Linthicum, MD (US)

(*) Notice: Subject to any disclaimer, the term of this patent is extended or adjusted under 35 U.S.C. 154(b) by 501 days.

(21) Appl. No.: 09/698,834

(22) Filed: Oct. 27, 2000

Related U.S. Application Data (60) Provisional application No. 60/229,131, filed on Aug. 30, 2000.

(51) Int. Cl.[7] ............................... H04J 3/06; H04L 7/00
(52) U.S. Cl. ..................... 370/360; 370/413; 370/516; 340/2.6; 340/3.2; 375/371
(58) Field of Search .................. 370/231, 235, 370/357, 360, 386, 388, 412, 413, 414, 503, 516; 340/2.1, 2.2, 2.21, 2.24, 2.26, 2.27, 2.6, 3.1, 3.2, 14.1, 14.2; 375/356, 357, 371; 327/141, 144, 151, 153, 160, 161

(56) References Cited

U.S. PATENT DOCUMENTS

| | | | | |
|---|---|---|---|---|
| 4,833,695 A | * | 5/1989 | Greub | 375/371 |
| 5,258,660 A | * | 11/1993 | Nelson et al. | 327/141 |
| 5,272,390 A | * | 12/1993 | Watson et al. | 327/141 |
| 5,309,426 A | | 5/1994 | Crouse et al. | |
| 5,367,520 A | * | 11/1994 | Cordell | 370/60 |
| 5,555,262 A | | 9/1996 | Urbansky | 370/102 |
| 5,666,351 A | | 9/1997 | Oksamen et al. | 370/474 |
| 5,796,795 A | * | 8/1998 | Mussman et al. | 375/372 |
| 5,923,654 A | * | 7/1999 | Schnell | 370/390 |
| 6,002,280 A | * | 12/1999 | Robbins et al. | 327/156 |
| 6,028,816 A | * | 2/2000 | Takemae et al. | 365/233 |
| 6,052,376 A | * | 4/2000 | Wills | 370/419 |
| 6,157,229 A | * | 12/2000 | Yoshikawa | 327/149 |
| 6,188,690 B1 | * | 2/2001 | Holden et al. | 370/390 |
| 6,232,806 B1 | * | 5/2001 | Woeste et al. | 327/149 |

FOREIGN PATENT DOCUMENTS

EP    0598455    11/1993    ............. H04J/3/06

OTHER PUBLICATIONS

IPER dated Feb. 26, 2004 for International Application No. PCT/US01/27037.
PCT, "International Search Report".

* cited by examiner

*Primary Examiner*—Alpus H. Hsu
(74) *Attorney, Agent, or Firm*—Michael R. Cammarata; David L. Soltz (57) ABSTRACT

Consistent with the present invention, programmable input and output buffers are provided on each port of each stage of a distributed system in order to reduce data skew and preserve data synchronization. The programmable buffers provide the ability to add delay to data paths having less skew to compensate or match the skew associated with data paths having greater skew. Accordingly, the programmable buffers can equalize data skew and preserve data synchronization at each stage in the distributed system. As a result, individual stages can be placed farther apart, thereby facilitating larger distributed systems.

51 Claims, 9 Drawing Sheets

TECHNIQUES AND ARCHITECTURES FOR IMPLEMENTING A DATA SKEW EQUALIZER FOR DATA ALIGNMENT IN A DISTRIBUTED SYSTEM

This application claims the benefit of provisional application No. 60/229,131, filed Aug. 30, 2000.

The present invention relates to a communication system including distributed switches, and techniques and architectures for reducing data skew in such systems.

BACKGROUND OF THE INVENTION

In response to increased demand for network capacity, wavelength division multiplexed (WDM) systems have been developed to increase the bandwidth of individual optical fiber networks. Such excess capacity must be managed, however, by directing or switching data to desired locations. Accordingly, high capacity switches have been developed to switch hundreds of gigabits per second to different optical fiber paths. In certain applications, however, multiple terabits of data must be switched. In which case, conventional switches may not have the required capacity to rapidly switch this much data.

SUMMARY OF THE INVENTION

To achieve even greater capacity, a distributed switching system is proposed whereby a distributed group of lower capacity switches are arranged in bays, each of which having one or more stages and appropriately coupled to one another to effectively function as a single high capacity switch. In order to properly route data through such a system, data is typically switched synchronously whereby data packets input to each stage are aligned with one another, output to a switch matrix, and supplied to desired outputs, where the data is fed to a subsequent stage or output from the system. Synchronized switching is often used with transmission protocols requiring data synchronization, such as the SONET (Synchronous Optical Network) protocol.

If the connections between stages in the distributed system are not substantially the same length, or components that make up the switch system do no t operate at the same speed, data may arrive at different times at the inputs to each switch stage, resulting in "data skew." If the received data is not properly synchronized, however, the data cannot be properly switched.

Consistent with the present invention, a distributed switching system is provided in order to achieve greater switching capacity. The distributed switching system includes a plurality of switches, each of which having a plurality of input buffers circuits, a switch matrix circuit and a skew adjustment circuit. Each of the plurality of input buffer circuits receives a respective one of a plurality of input data streams, and stores data associated with the data streams in selected buffer stages. The switch matrix and skew adjustment circuits are coupled to the input buffer circuits. Moreover, the skew adjustment circuit is configured to control the plurality of input buffer circuits to supply data respectively stored therein to the switch matrix circuit when an amount of the data stored in one of said plurality of input buffer circuits equals a predetermined amount.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION OF THE INVENTION

Consistent with the present invention, programmable input and output buffers are provided on each port of each stage of a distributed system in order to reduce or substantially eliminate data skew and preserve data synchronization. The programmable buffers provide the ability to add delay to data paths having less skew to match the skew associated with data paths having greater skew. Accordingly, the programmable buffers can equalize data skew and preserve data synchronization at each stage in the distributed system. As a result, individual stages can be placed farther apart, thereby facilitating larger distributed systems.

Figure 1:
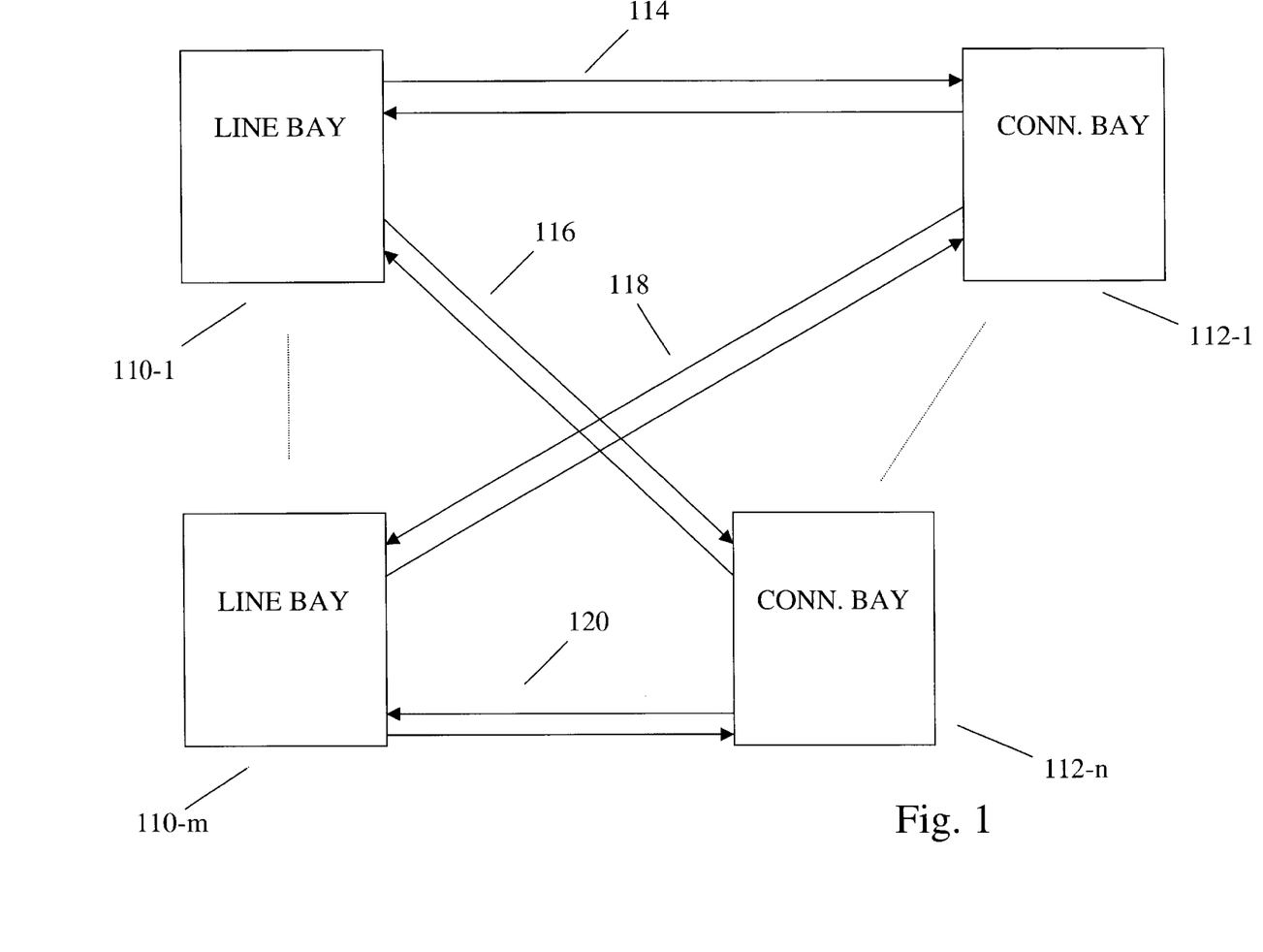
FIG. 1 illustrates an exemplary multi-bay switching system consistent with the present invention.

FIG. 1 illustrates an exemplary distributed system 100 including line bays 110-1, 110-m and connecting bays 112-1, 112-n. A line bay contains input and output ports and the first stage or stages of system 100. As used herein, a "stage" is a point in the distributed system whereby data from all input ports needs to be synchronized for further data processing to occur, such as switching. An exemplary stage will be described in greater detail below. A stage could include a bay or an individual printed circuit board or card provided in a bay.

As further shown in FIG. 1, connecting bays 112-1 to 112-n provide an additional stage or stages of switching. Connections 114 (e.g., an optical fiber, fiber ribbon cable, wire or trace) couple line bay 110-1 with connecting bay 112-1, while connections 116 couple line bay 110-1 with connecting bay 112-n. Moreover, connections 118 and 120 respectively couple connecting bays 112-1 and 112-n to line bay 110-m. Often, each of these connections has a different length due, for example, to constraints in the positioning of the line and connecting bays, e.g., in a central office. For example, connecting bay 112-n may be placed farther away from line bay 110-1 than line bay 110-m. Accordingly, connection 116 between line bay 110-1 and connecting bay 112-n is longer than connection 120 between line bay 110-m and connecting bay 112-n. Data transmitted along line 120, therefore, will arrive at connecting bay 112-n before data transmitted on 116, even though both sets of data may have been launched at the same time from respective line bays 110-1 and 110-m. The lag between data transmitted on line 116 and line 120 translates into data skew at connecting bay 112-n. Likewise, data launched on lines 116 and 120 from connecting bay 112-n will reach line bays 110-1 and 110-m at different times, also resulting in further data skew.

Figure 2:
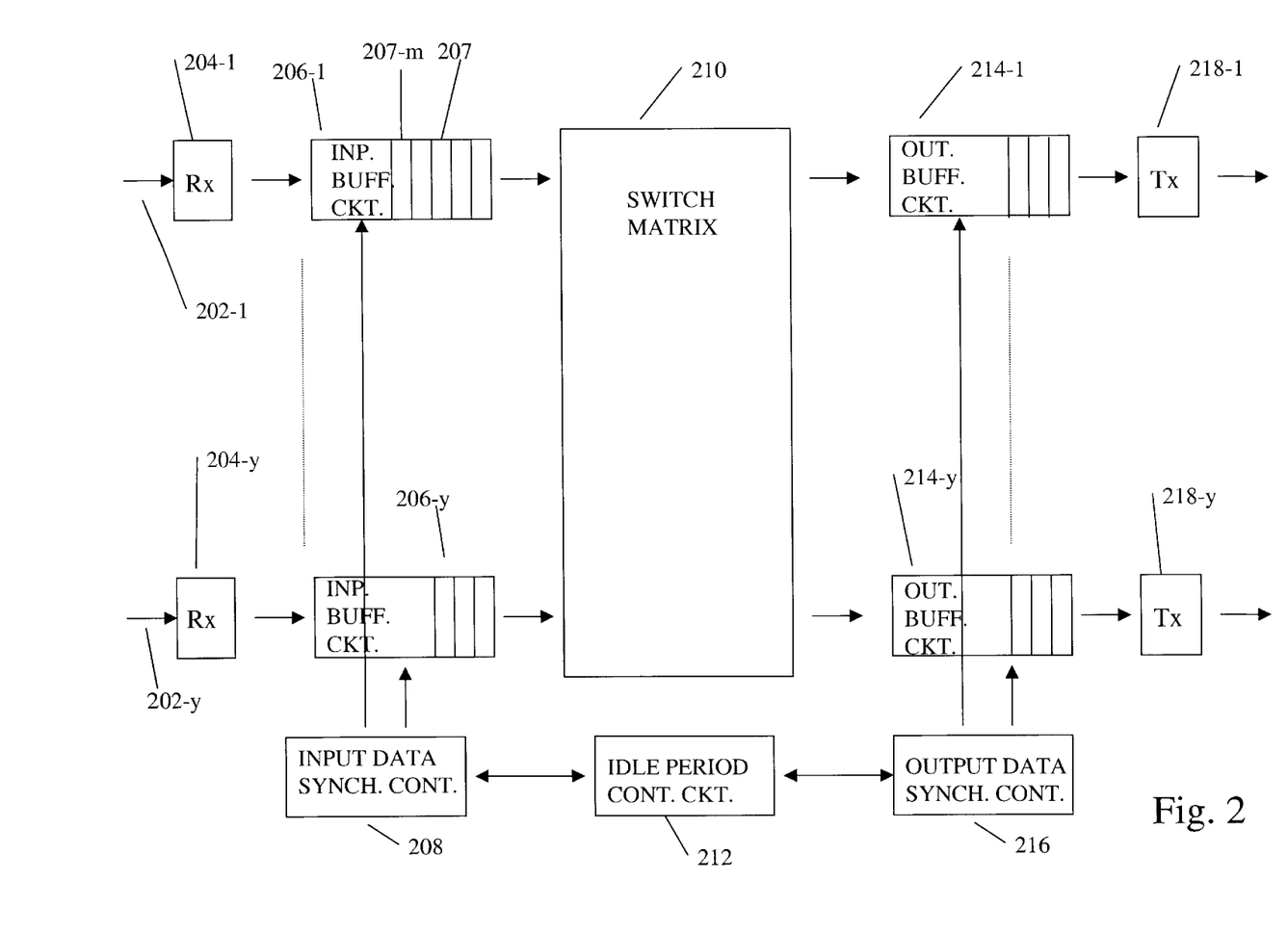
FIG. 2 illustrates an exemplary switching stage consistent with the present invention.

Accordingly, further in accordance with the present invention, each bay includes at least one stage, including a switch 200 having the structure shown in FIG. 2. Switch 200 receives data often in the form of modulated optical signals on individual lines 202-y, which include an optical waveguide such as an optical fiber. The optical signals are supplied to respective receive circuits 204-1 to 204-y, which include known components for converting the received light into electrical signals, as well as circuitry for retiming and appropriately shaping the electrical signals into readily discernible pulses. The receiver circuits may also include circuitry for framing the received data, i.e., grouping the received data with additional overhead bytes for routing the data through switch 200. Such framing circuits are described, for example, in U.S. patent application Ser. No. 09/421,059, incorporated by reference herein.

Figure 3:
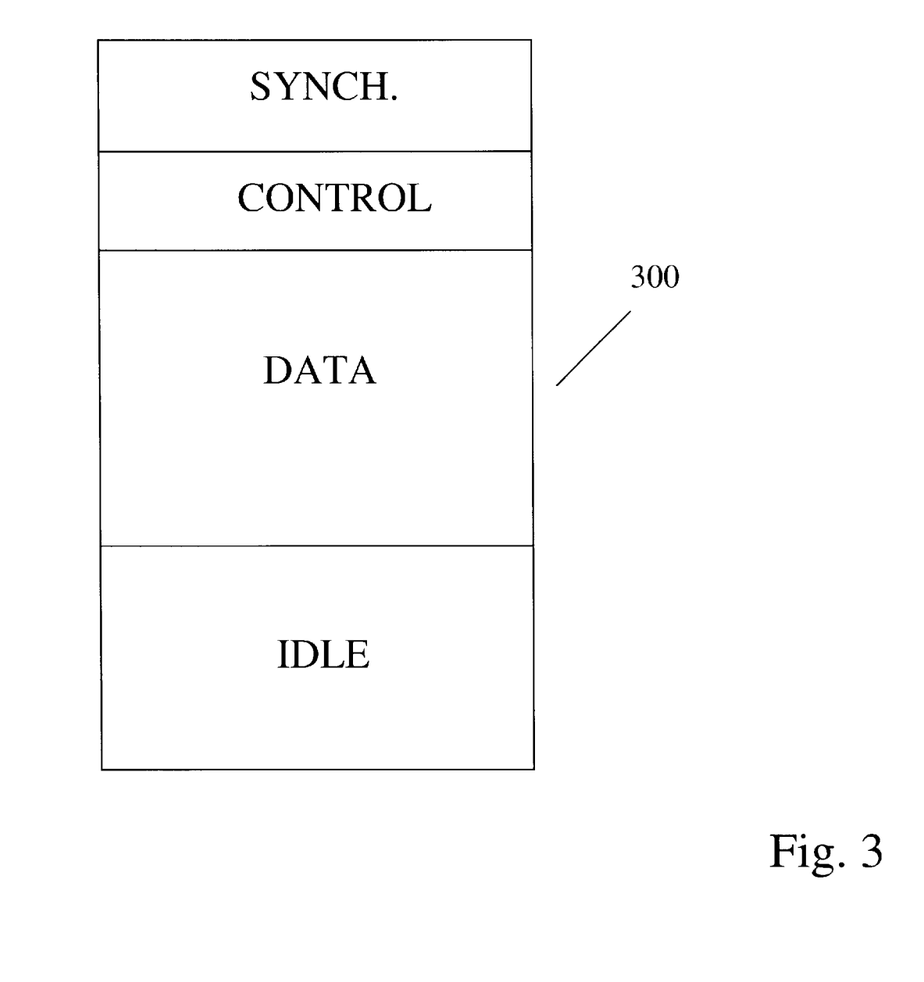
FIG. 3 illustrates a data frame utilized by the switching stage shown in FIG. 2.

FIG. 3 illustrates an exemplary frame 300 output from one of receive circuits 204-1 to 204-y. Frame 300 includes a first string of synchronization bytes, which are used by circuitry in switch 200 to identify the beginning of a frame. One or more control bytes may follow the synchronization bytes. These bytes may contain information for configuring the switch in a desired manner. As further shown in FIG. 3, the frame may also include data bytes to be routed through the switch, as well as a plurality of idle bytes, to be discussed in greater detail below.

Returning to FIG. 2, frames are supplied from each of receive circuits 204-1 to 204-y to corresponding programmable first-in-first-out (FIFO) input buffer circuits 206-1 to 206-y, each of which including a plurality of stages 207 storing a corresponding byte of the received frame. Further, each input buffer circuit 206 is coupled to a data skew adjustment circuit including input data synchronization control circuit 208 and idle period control circuit 212. The frames of data are next supplied to switch fabric circuit 210 under control of circuit 208 in conjunction with circuit 212. Switch fabric circuit 210, in turn, routes the frames to corresponding output buffer circuits, which output the frames under control of idle period control circuit 212 and output data synchronization control circuit 216. If required transmission circuits can be provided to extract and reformat the data, or retransmit the frames in optical or electrical form. Transmission circuits are further described in U.S. patent application Ser. No. 09/421,059, identified above.

In more detail, each frame byte output from receiver circuits 204 is supplied successively to input buffer circuits 206, and stored in individual locations of each buffer circuit. As each byte is input to a particular buffer circuit, the preceding byte is shifted to an adjacent location. Accordingly, the first byte of each frame loaded into the input buffer circuit is the synchronization byte, and this byte is incrementally shifted to adjacent locations as additional bytes are fed into the buffer. The buffer thus "fills" with data as successive bytes are supplied to it. Input buffer circuits receiving frames carrying data associated with shorter lines 202, however, will begin receiving data relatively early and will fill before those buffer circuits receiving data from longer lines.

Input data synchronization control circuit 208 monitors the synchronization byte in each data frame as it is incrementally shifted within each input buffer circuit. Consistent with the present invention, when the synchronization byte is detected in a particular location, thereby indicating that the buffer has filled to a particular depth or has reach a particular data threshold, synchronization control circuit 208 supplies appropriate signals to each of input buffer circuits 206-1 to 206-y to simultaneously launch the contents of each buffer circuit to switch matrix 210. As a result, the input buffer circuits 206 generate a synchronized output in which each frame is aligned and supplied to switch matrix 210 at the same time.

In one particular embodiment, input data synchronization control circuit can be programmed with a threshold equal to the midpoint depth of each of input buffer circuits 206-1 to 206-y. In which case, input data synchronization controller 208 controls input buffer circuits 206-1 to 206-y to output bytes to switch matrix 210 when any one of the input buffer circuits reaches this depth or when half the locations contain data, i.e., when the synchronization byte is shifted into midpoint location 207-m, for example. Accordingly, input buffer circuits 206 in combination with input data synchronization control circuit 208 generate a self-adjusted output that does not require an external signal to synchronize the frames supplied from the input buffer circuits. Moreover, the first embodiment does not require any prior knowledge of which line may be skewed fast or slow, as the input buffer circuits are triggered to output data to switch matrix 210 on whichever input buffer circuit receives enough bytes to fill the buffer to the threshold first.

Moreover, if input buffer circuit 206-1, for example, suddenly receives data with less skew than the other input buffers, input data synchronization control circuit 208 can trigger the remaining buffer circuits to output data when buffer circuit 206-1 fills to the threshold. When input buffer circuit 206-1, however, first receives data, it may be filled up beyond the threshold while the previous frame is still being output to switch fabric 210. Accordingly, input buffer circuit 206-1 should be brought back to the triggering value (for example, half-filled) in order to prevent possible data overflow and possible data loss on an additional input buffer that starts receiving data with even less skew.

In which case, input data synchronization control circuit 208 senses, based on the storage location of synchronization byte, that buffer circuit 206-1 is filling beyond the threshold, i.e., beyond the half-way point. Circuit 208 next generates a sense signal corresponding to the number bytes in buffer 206-1 that exceed the threshold to idle period control circuit 212, thereby causing circuit 212 to return an idle byte value to circuit 208. The idle byte value is used by input data synchronization control circuit 208 to insert an appropriate number of idle bytes between frames output from buffer circuit 206-1.

Specifically, a data frame is not output from the input buffer circuits 206 until a delay associated with the number of idle bytes in the frame has lapsed. Thus, during the delay, the next frame continues to load into the buffer. If the preceding frame is loaded into an input buffer circuit beyond the threshold before it is output to switch matrix 210, the next frame should be output before its synchronization byte is shifted beyond the midpoint buffer location in order to prevent data overflow of the buffer. By sufficiently reducing the number of idle bytes in successive frames over several frame periods, preceding frames take less time to output, and subsequent frames load to buffer locations successively closer to the threshold before being output to switch matrix 210. This process continues until all subsequent frames are loaded precisely to the threshold. Accordingly, input buffer underflow and overflow can be avoided, even when new lines are added or removed, and without interruption to traffic through the switch.

If an input buffer circuit that was previously the fastest is removed, circuit 208 in conjunction with circuit 212 in a manner similar to that described above will allow the other input buffer circuits time to fill by inserting additional idle bytes between frames until one of the remaining input buffer circuits reaches the triggering threshold.

Accordingly, consistent with an aspect of the present invention, more bandwidth is provided than otherwise required, so that the number of idle bytes can be changed to self-adjust data frames in response to the addition or removal of links with more or less skew. Since a network is typically set up for a particular data rate, in order to preserve this data rate throughout the network, the number of idle bytes between frames may have to be adjusted over a several frame period.

Setting the threshold to the middle of the buffer depth can adjust for an equal amount of skew for either an early or delayed line. The input buffer size in the first embodiment, however, is only half efficient because it is not known in advance which input buffer circuit skewed for an early or delayed line. Thus, all input buffer circuits typically handle an equal amount of skew in either direction (i.e., either side of the threshold), thereby reducing the input buffer size effectiveness to half of its actual size.

If, however, the skew for each individual input buffer circuit is known based on, for example, the distance between bays, the input data synchronization controller 208 can trigger all the input buffer circuits to output to switch matrix circuit 210 when any one of the input buffer circuits reaches its own threshold. One advantage of this feature of the present invention is that the entire capacity of each input buffer circuit can used, and thus the buffer size can be reduced to its own individual threshold. Alternatively, if a larger buffer is used, more skew can be tolerated relative to the embodiment described above.

As noted above, frames are output from input buffer circuits and switched by switch matrix 210, which routes or switches each frame to a respective one of output buffer circuits 214-1 to 214-y. Consistent with a further aspect of the present invention, output data synchronization control circuit 216 in conjunction with idle period control circuit 212 can be configured to delay the outputs from output buffer circuits 214-1 to 214-y in accordance with the length of each line coupled to the output buffer circuits. The delay can be varied by changing the number of idle bytes in frames output from the output buffer circuits in much the same way as the number of idle bytes can be altered in frames supplied to switch matrix circuit 210. Accordingly, if a destination bay is located relatively far from output buffer circuit 214-1, for example, output buffer circuit 214-1 can be triggered to generate its output with relatively little delay. On the other hand, if the destination bay is located relatively close to a corresponding output buffer circuit, buffer circuit 214-y, for example, output data synchronization control circuit 216 can trigger that output buffer circuit to output its data with more delay. Thus, the outputs from buffer circuits 214-1 and 214-y can be synchronized and can arrive at their respective destinations at substantially the same time.

Programmable output buffer circuits allow for greater skew to be equalized throughout the system when used in conjunction with the input buffer circuits. Without the output buffer circuits, however, larger input buffer circuits may be required or less skew can be tolerated.

A further feature of the present invention will next be described with reference to FIG. 4. System 400 shown in FIG. 4 includes line bays 410 and 430, as well as a connecting bay 420, each of which includes at least one switch having the same or similar structure as that discussed above in connection with FIG. 2. For simplicity, the internal structure of line bays 410 and 420, as well as selected components in connecting bay 420 are not shown in FIG. 4. Frames are output from line bay 410 along line 412, supplied to input buffer circuit 420-1 of connecting bay 420. The frames are then appropriately switched through a switch matrix circuit (not shown), and output through output buffer circuit 420-3 on line 413 back to line bay 410. Frames output from line bay 430 are supplied along line 414 to input buffer circuit 420-2. These frames are then switched and output through buffer circuit 420-4 along line 415 back to line bay 430.

Figure 4:
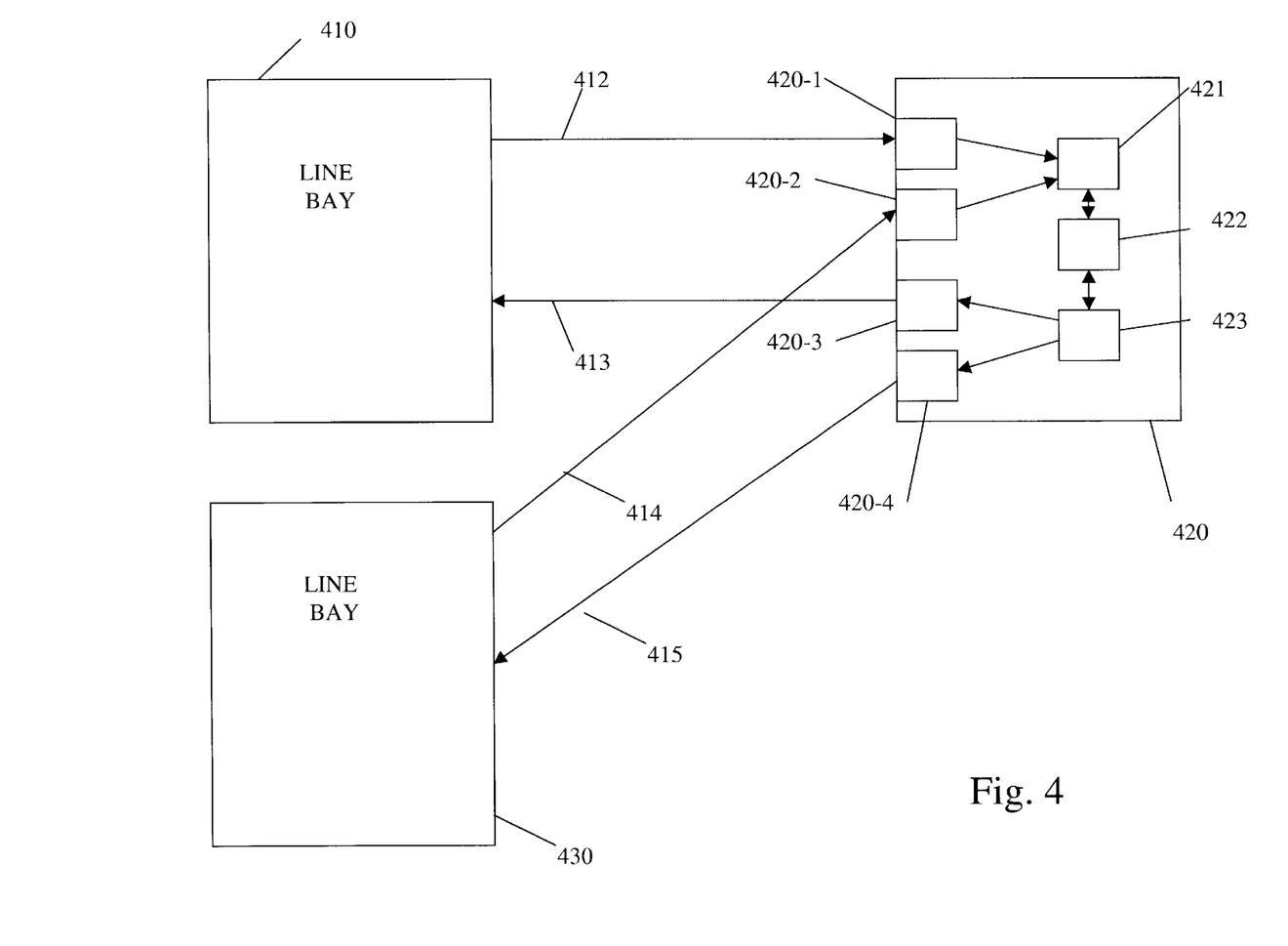
FIG. 4 illustrates an additional example of a multi-bay switching system consistent with the present invention.

In the example shown in FIG. 4, delay information associated with lines 412 and 414 can be used to adjust the delays on lines 413 and 415 so that output data arrives at bays 410 and 430 at substantially the same time. In particular, since lines 412 and 413 have substantially the same length and are relatively short, delay information associated with line 412 can be used to adjust the output timing on line 413 to have greater delay. Likewise, delay information associated with longer line 414 can be used to adjust the output timing of data supplied on line 415 to have less delay, because line 415 has approximately the same length as line 414. As a result, data output from bay 420 reaches bays 410 and 430 substantially simultaneously.

In operation, data frames can be self-aligned to the midpoint on input buffer circuits 420-1 to 420-2 in a manner similar to or the same as that described above. Delay information associated with input lines 414 and 412 can be supplied through known inband messaging techniques to input buffer circuits 420-1 and 420-2, and then to input data synchronization control circuit 423 and idle period control circuit 422. Alternatively, the delay information can be supplied from an external source or can be determined by input data synchronization controller 208 by subtracting the depth of the non-triggering input buffer circuit depth from the triggering input buffer circuit depth. For example, assuming input buffer circuit 420-1 fills to its threshold before input buffer circuit 420-2, input data synchronization control circuit will measure the difference in depth between buffer circuits 420-1 and 420-2 and determine a relative delay or skew accordingly. The delay information is then used by idle period control circuit 422 in conjunction with output data synchronization control circuit 216 to insert/remove idle bytes between frames output from output buffer circuits 420-3 and 420-4. In particular, fewer idle bytes are inserted between frames output on line 415 to offset the propagation delay associated with longer line 415, while idle bytes are added between frames output on shorter line 413 so that frames output on lines 413 and 415 reach bays 410 and 430 at substantially the same time.

Figure 5:
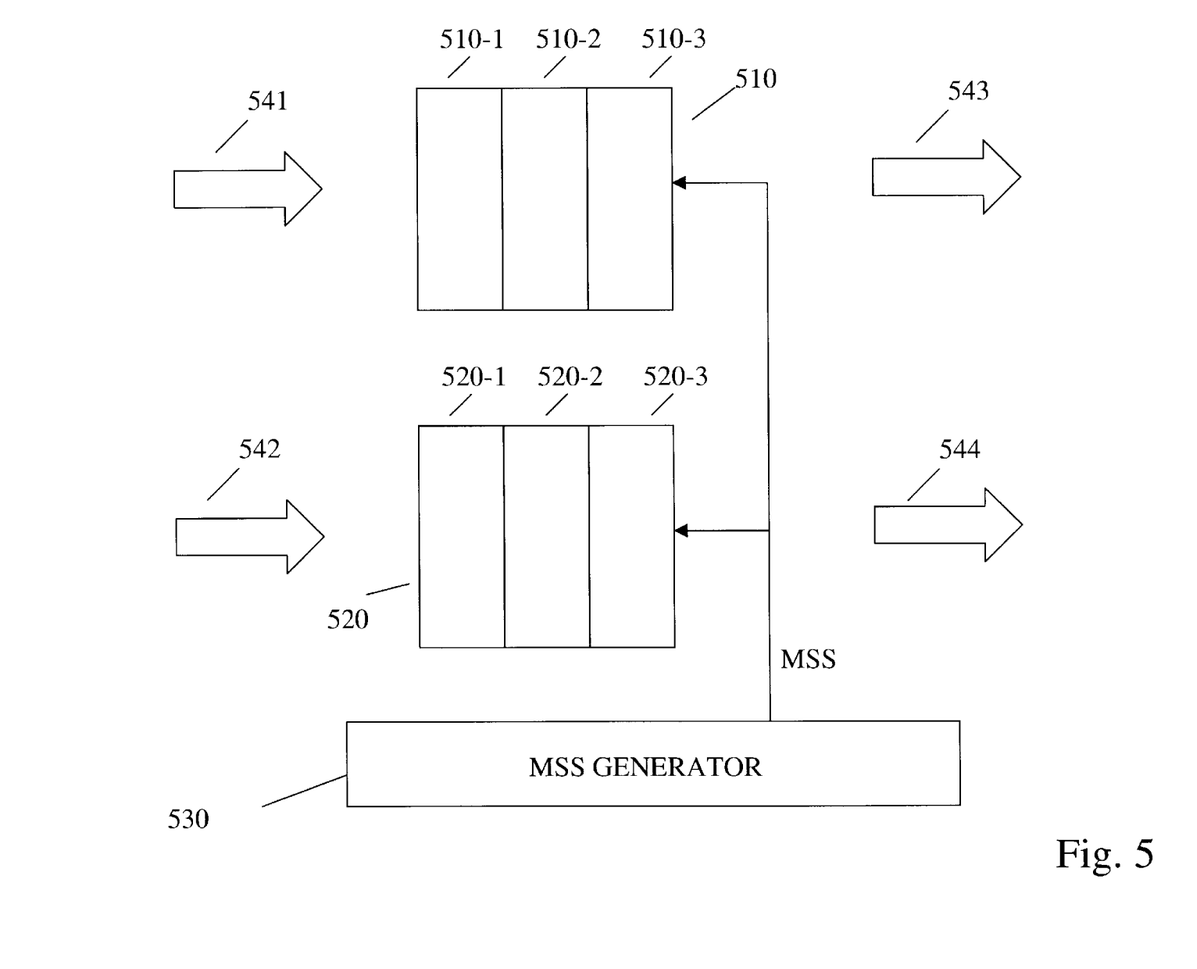
FIG. 5 illustrates a further example of a multi-bay switching system consistent with the present invention.

FIG. 5 illustrates a further feature of the present invention wherein skew can be equalized between multiple bays 510 and 520, each of which including multiple stages 510-1 to 510-3 and 520-1 to 520-3, respectively. Each stage has a structure similar or the same as switch 200 shown in FIG. 2. Data frames, represented by block arrows 541 and 542, are respectively supplied to switch stage 510-1 and 520-1 of corresponding bays 510 and 520. In a manner similar to that described above in connection with FIG. 4, delay or skew information is obtained for each input buffer circuit in stages 510-1 and 520-1, and either inserted into the control bytes of each frame (see FIG. 3) or sent to a bay controller for out of band control. In either case, the delay information is accumulated at each of stages 510-2 and 510-3 in bay 510 and stages 520-2 and 520-3 in bay 520. For example, the control byte in each frame can be updated by the input data synchronization control circuit as the frame propagates through each stage. The output data synchronization control circuit in the last stage of each bay, e.g., stage 510-3 and stage 520-3, are configured to compare the accumulated skew information associated with each output buffer circuit with a master system synchronization (MSS) generated by an MSS generator 530. The output buffer circuits in stages 510-3 and 520-3 can then be triggered to output data with appropriate delays for proper synchronization and alignment. The output data is represented by block arrows 543 and 544. Thus, by referencing the accumulated data skew relative to a distributed master system synchronization signal, if one bay receives all input signals with little inter-bay skew, the output buffer circuits of that bay can be triggered to output with greater delay than a bay that receives signals with more inter-bay skew.

The above-described embodiments of the present invention rely on idle bytes for varying the delay between frames to compensate for skew. In some applications, however, exact bandwidth protocols, such as SONET (Synchronous Optical NETworking protocol) and SDH (Synchronous Digital Hierarchy), transmit contiguous frames of data without idle bytes therebetween. Accordingly, the above-described techniques may not be applicable to systems transmitting data conforming to these protocols.

Figure 6:
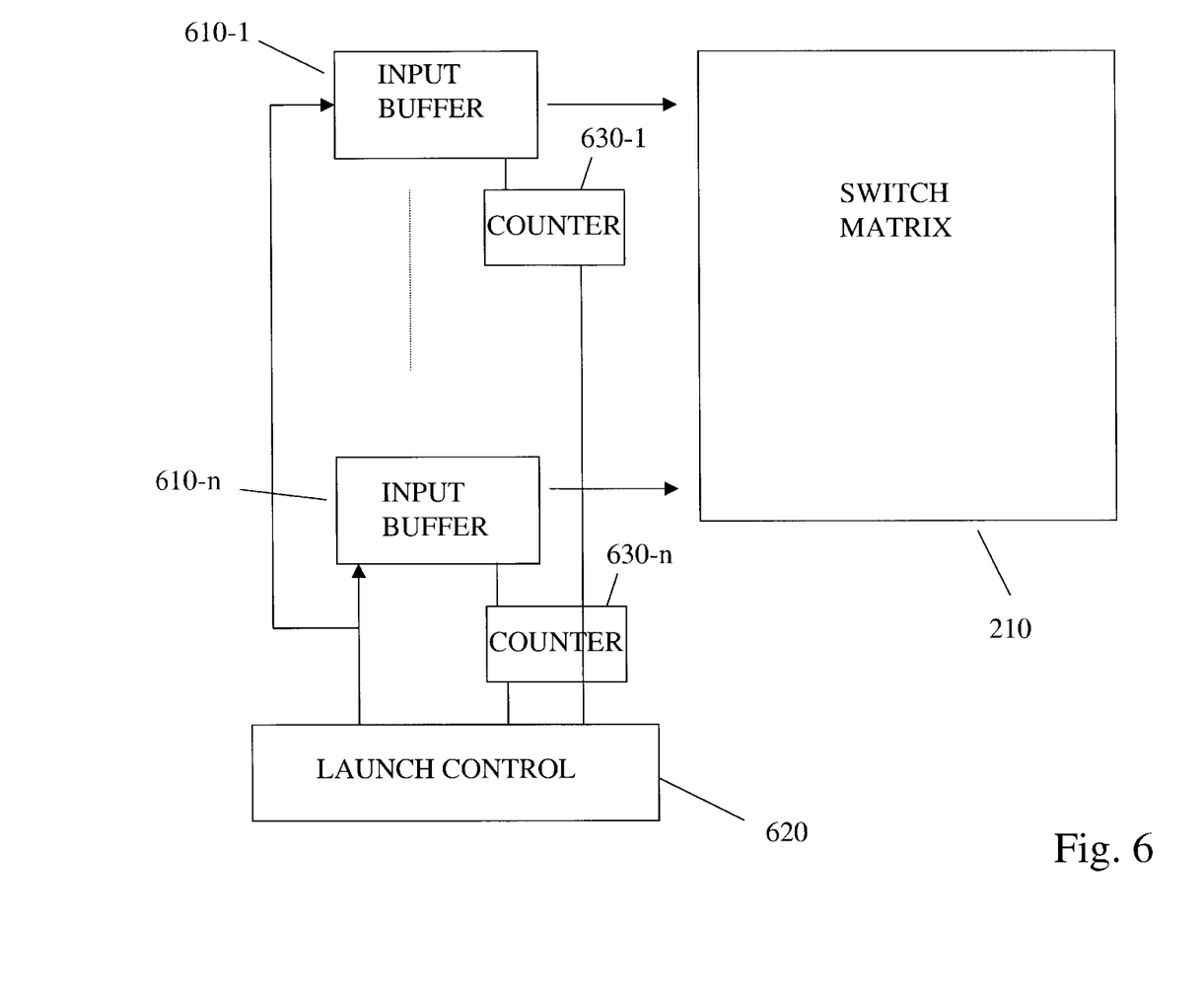
FIGS. 6–9 illustrate further embodiments of the present invention in which frames are switched without idle bytes.

Accordingly, consistent with further features of the present invention, skew compensation can be performed without idle bytes. For example, as shown in FIG. 6, launch control circuit 620, typically provided external to a switch, supplies a launch control signal to input buffer circuits 610-1 to 610-n. The launch control signal can also be supplied to other switches, not shown. In response to the launch control signal, input buffer circuits 610-1 to 610-n output data to switch matrix circuit 210. In FIG. 6, skew is determined by counting the number of bytes of each frame added to input buffer circuits 610-1 to 610-n before the launch control signal is applied. The number of stored bytes or the fill depth at the instant the launch signal is applied is indicative of the delay associated with each line input to buffer circuits 610-1 to 610-n. Alternatively, the delay can be measured by determining when a frame arrives (by identifying the start of frame bytes) and when the launch control signal is applied to the input buffer circuits. The delay information can be fed back to launch control circuit 620 to adjust the output timing of the launch control signal so that output buffer circuits simultaneously supply data to switch matrix 210 when the last frame arrives at its respective input buffer circuit, thereby eliminating the input skew.

Figure 7:
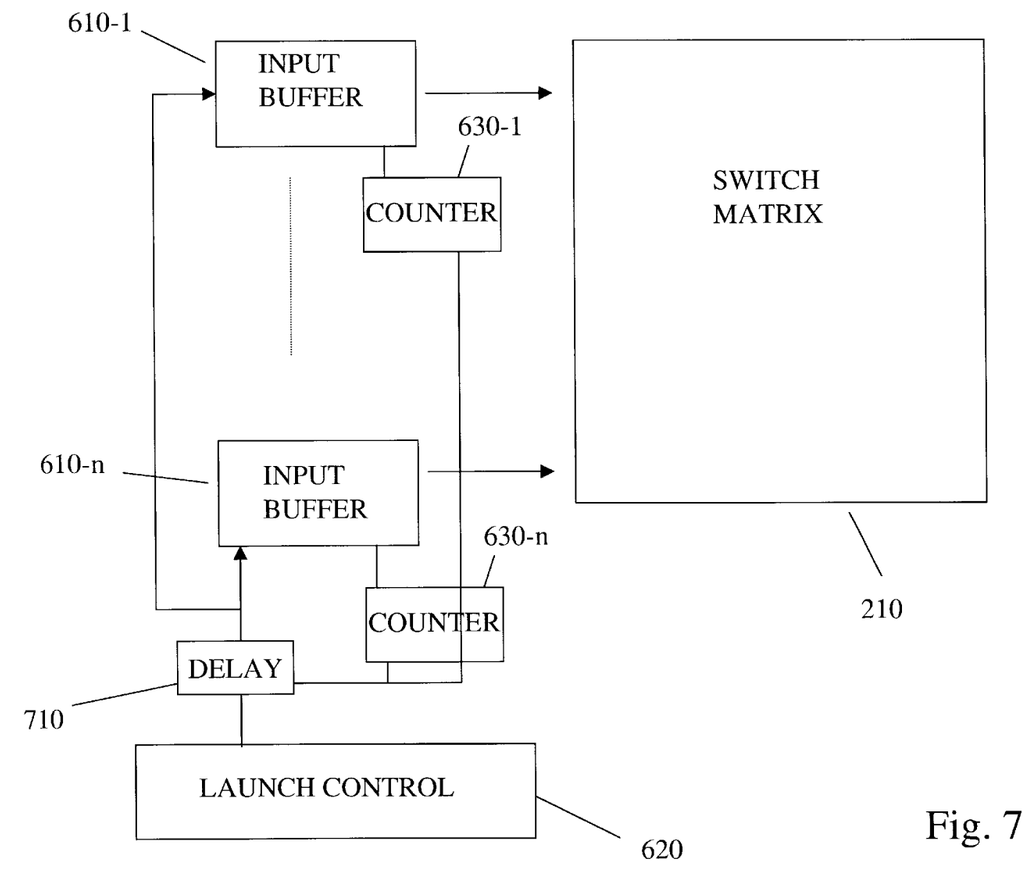

FIG. 7 illustrates an alternative approach similar to the embodiment shown in FIG. 6. In FIG. 7, however, the launch control signal is supplied to the input buffer circuits via memory or buffer 710 rather than being applied directly from launch control circuit 620. Instead of launch control circuit 620 itself adjusting the timing associated with the launch control signal, memory 710 outputs the launch control signal with a delay controlled in accordance with the outputs from counters 630-1 to 630-n. The embodiment shown in FIG. 7 otherwise functions in a manner similar to that described above in connection with FIG. 6.

Figure 8:
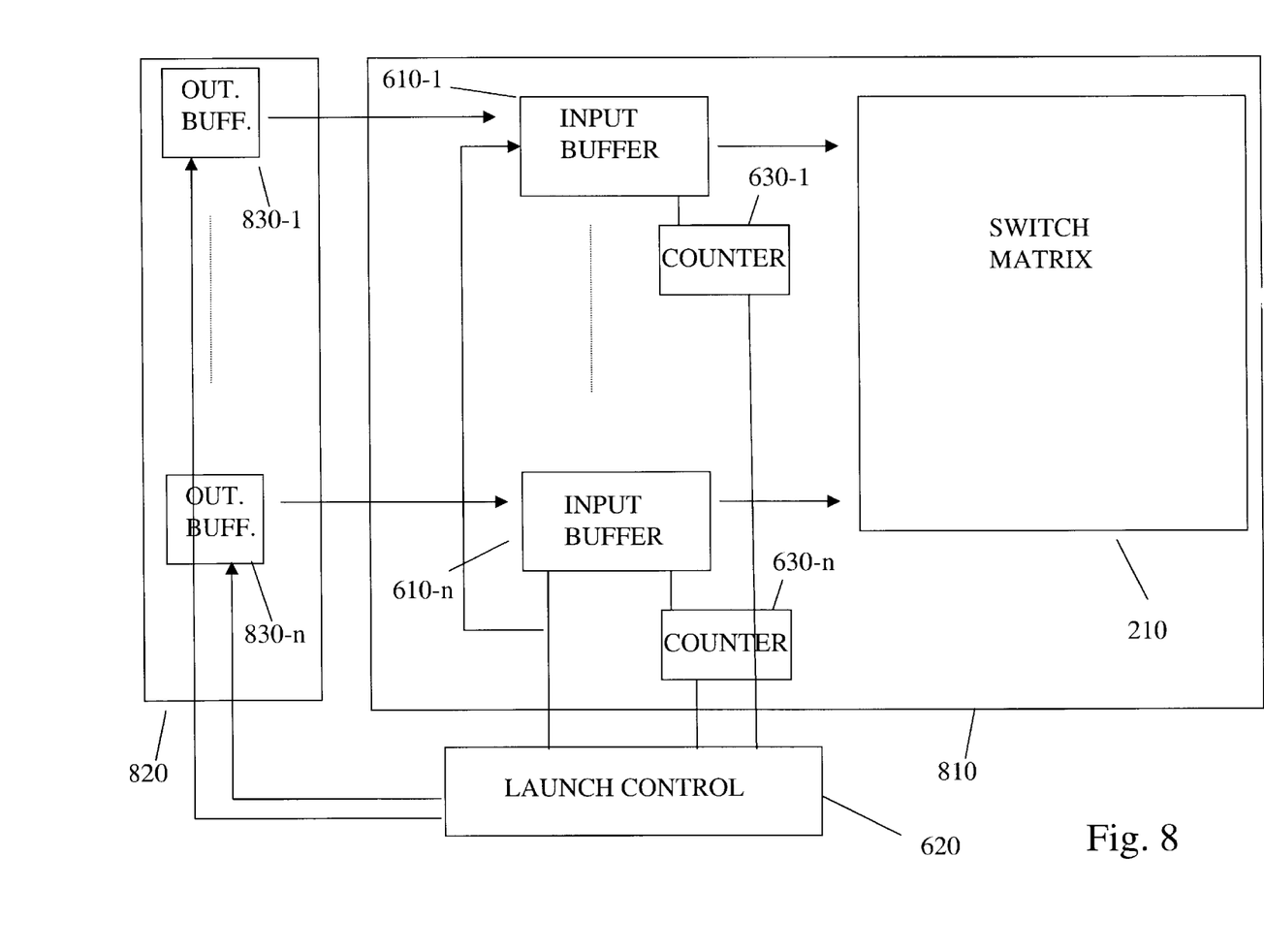

FIG. 8 illustrates a further embodiment, which is also similar to FIG. 6. In FIG. 8, however, the timing of the launch control signal is not adjusted, but is typically supplied to the input buffer circuits at regular time periods. Skew compensation is achieved by supplying delay information gleaned by counters 630-1 to 630-n in one switch 810 to launch control circuit 620, which in turn supplies control signals to appropriately delay the outputs of buffer circuits 830-1 to 830-n of an upstream switch 820. Other components of switches 810 and 820 have been omitted to simplify the explanation thereof. Output buffer circuits 830-1 to 830-n, in turn, output data frames with variable delays so that the frames arrive at input buffer circuits 610-1 to 610-n with little or no skew. The frames are thus synchronized and supplied to switch matrix 210 substantially simultaneously upon application of launch control circuit 620 to input buffer circuits 610-1 to 610-n.

Figure 9:
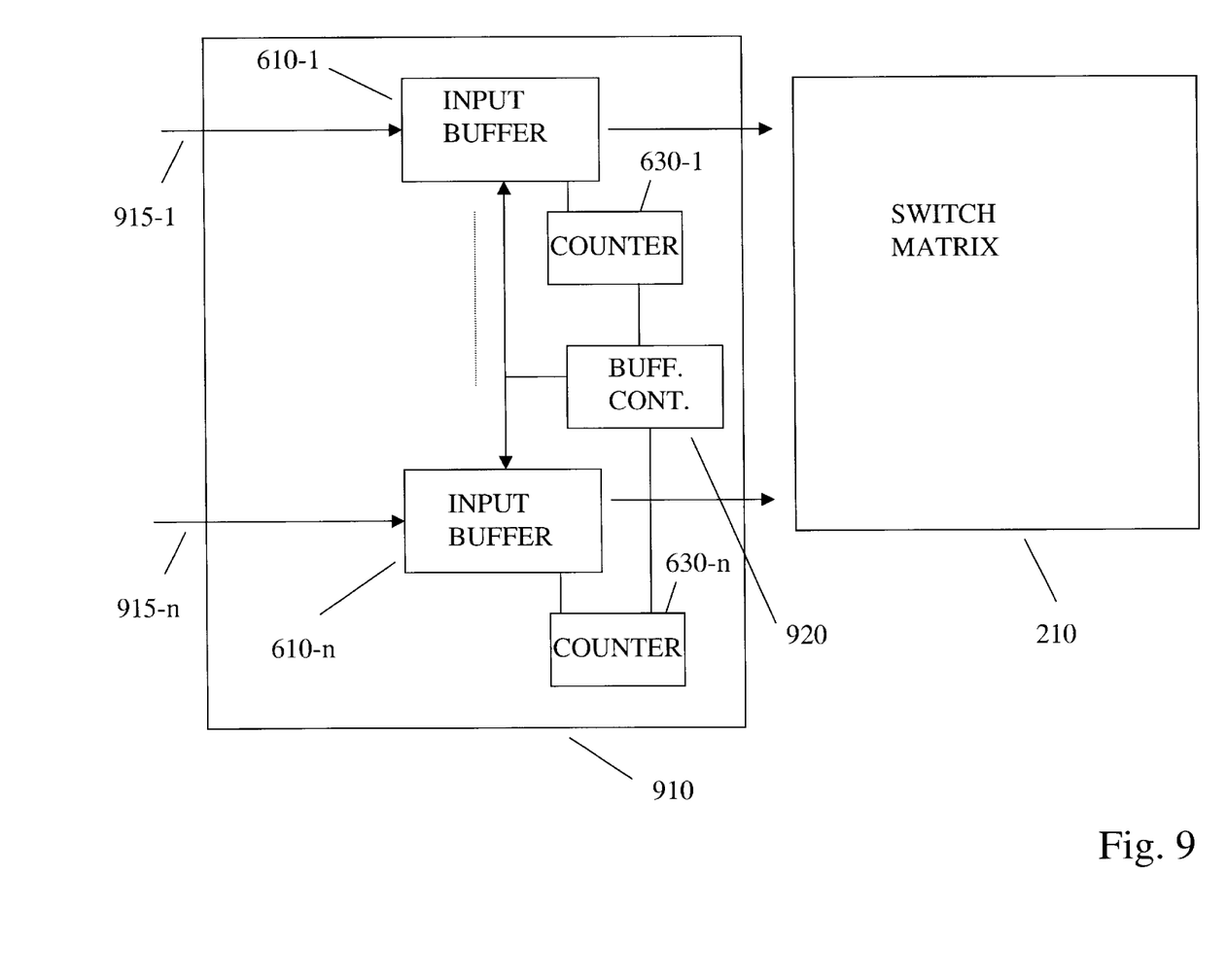

In FIG. 9, no launch control signal is applied externally to input buffer circuits 610-1 to 610-n of switch 810. Instead, a clock signal (CLK) is supplied to counter circuits 630-1 to 630-n to provide a reference for the counter circuits to determine the arrival time, and thus the delay associated with each input line 915-1 to 915-n. The delay information is supplied to input buffer control circuit 920, which outputs appropriate control signals to input buffer circuits 610-1 to 610-n to delay the frames output therefrom until the last-to-arrive frame, i.e., the one with the greatest delay, reaches its respective input buffer circuit. The frames are then launched substantially simultaneously with little or no skew to switch matrix circuit 210. Optionally, upstream output buffer circuits can be adjusted to selectively delay data supplied to the input buffer circuits so that the earliest and latest arriving frames can be accommodated.

In the embodiment shown in FIG. 9, input buffer circuits 610-1 to 610-n, counters 630-1-to 630-n, and buffer control circuit 920 are integrated on a single chip. Accordingly, skew compensation can be performed on chip without an externally applied launch control signal, which, in multi-bay systems, can be difficult or complicated to route to individual switches.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A switch, comprising:
   a plurality of input buffers circuits, each of said plurality of input buffer circuits receiving a respective one of a plurality of input data streams, said input buffer circuits storing data associated with said data streams in selected buffer locations;
   a switch matrix circuit coupled to said input buffer circuits; and
   a skew adjustment circuit coupled to said plurality of input buffer circuits, said skew adjustment circuit being configured to control said plurality of input buffer circuits to supply said data respectively stored therein to said switch matrix circuit when an amount of said data stored in one of said plurality of input buffer circuits equals a predetermined amount.

2. A switch in accordance with claim 1, wherein said input data stream includes a plurality of frames, each frame including a group of data bits and a group of idle bits, said skew adjustment circuit being configured to adjust a number of bits within said group of idle bits to thereby vary a delay between successive ones of said plurality of frames output from one of said plurality of input buffers.

3. A switch in accordance with claim 1, whereby selected frames output from said input buffer circuits are supplied to said switch matrix circuit substantially simultaneously.

4. A switch in accordance with claim 1, further comprising a plurality of output buffer circuits coupled to said switch matrix circuit.

5. A switch in accordance with claim 4, wherein each of said plurality of input data streams includes a plurality of frames, said plurality of frames being directed to corresponding ones of said plurality of output buffer circuits through said switch matrix circuit, said output buffers being configured to launch said plurality of frames with varying delays under control of said skew adjustment circuit.

6. A switch in accordance with claim 5, wherein each of said frames includes a number of idle bits, said delays corresponding to a number of said idle bits in each of said plurality of frames.

7. A switch in accordance with claim 1, wherein said plurality of input buffer circuits includes programmable first-in-first out (FIFO) buffer circuits.

8. A switch in accordance with claim 4, wherein said plurality of output buffer circuits includes programmable first-in-first out (FIFO) buffer circuits.

9. A switch, comprising:
a plurality of input buffer circuits, each of said plurality of input buffer circuits receiving a respective one of a plurality of input data streams and including a plurality of locations, each input data stream including a plurality of bits, each said plurality of input buffer circuits successively storing a respectively one of said plurality of bits in a corresponding one of said plurality of input buffer circuit locations;
a switch matrix circuit coupled to said plurality of input buffer circuits; and
a skew adjustment circuit coupled to said plurality of input buffer circuits, said skew adjustment circuit being configured to control said plurality of input buffer circuits to output to said switch matrix circuit when half of said plurality of locations in one of said input buffer circuits have data stored therein.

10. A switch in accordance with claim 9, wherein said input data stream includes a plurality of frames, each frame including a group of data bits and a group of idle bits, said skew adjustment circuit being configured to adjust a number of bits within said group of idle bits to thereby vary a delay between successive ones of said plurality of frames output from one of said plurality of input buffers.

11. A switch in accordance with claim 10, whereby selected frames output from said input buffer circuits are supplied to said switch matrix circuit substantially simultaneously.

12. A switch in accordance with claim 9, further comprising a plurality of output buffer circuits coupled to said switch matrix circuit.

13. A switch in accordance with claim 12, wherein each of said plurality of input data streams includes a plurality of frames, said plurality of frames being directed to corresponding ones of said plurality of output buffer circuits through said switch matrix circuit, said output buffer circuits being configured to launch said plurality of frames with varying delays.

14. A switch in accordance with claim 10, further comprising a plurality of output buffer circuits coupled to said switch matrix circuit.

15. A switch in accordance with claim 14, wherein each of said plurality of input data streams includes a plurality of frames, said plurality of frames being directed to corresponding ones of said plurality of output buffer circuits through said switch matrix circuit, said output buffers being configured to launch said plurality of frames with varying delays under control of said skew adjustment circuit.

16. A switch in accordance with claim 15, wherein each of said frames includes a number of idle bits, said delays corresponding to a number of said idle bits in each of said plurality of frames.

17. A switch in accordance with claim 9, wherein said plurality of input buffer circuits includes programmable first-in-first out (FIFO) buffer circuits.

18. A switch in accordance with claim 12, wherein said plurality of output buffer circuits includes programmable first-in-first out (FIFO) buffer circuits.

19. A switch, comprising:
a plurality of input buffer circuits, each of said plurality of input buffer circuits receiving a respective one of a plurality of input data streams and including a plurality of locations, each input data stream including a plurality of bits, each said plurality of input buffer circuits successively storing a respectively one of said plurality of bits in a corresponding one of said plurality of buffer circuit locations;
a switch matrix circuit coupled to said plurality of input buffer circuits; and
a skew adjustment circuit coupled to said plurality of input buffer circuits, said skew adjustment circuit being configured to control said plurality of input buffer circuits such that a first one of said plurality of input buffer circuits outputs data to said switch matrix when a first predetermined number of said plurality of locations in said first one of said plurality of input buffer circuits have data stored therein, and a second one of said plurality of input buffer circuits outputs data to said switch matrix when a second predetermined number of said plurality of locations in said second one of said plurality of input buffer circuits have data stored therein.

20. A switch in accordance with claim 19, wherein said input data stream includes a plurality of frames, each frame including a group of data bits and a group of idle bits, said skew adjustment circuit being configured to adjust a number of bits within said group of idle bits to thereby vary a delay between successive ones of said plurality of frames output from one of said plurality of input buffers.

21. A switch in accordance with claim 19, whereby selected frames output from said input buffer circuits are supplied to said switch matrix circuit substantially simultaneously.

22. A switch in accordance with claim 19, further comprising a plurality of output buffer circuits coupled to said switch matrix circuit.

23. A switch in accordance with claim 22, wherein each of said plurality of input data streams includes a plurality of frames, said plurality of frames being directed to corresponding ones of said plurality of output buffer circuits through said switch matrix circuit, said output buffers being configured to launch said plurality of frames with varying delays under control of said skew adjustment circuit.

24. A switch in accordance with claim 23, wherein each of said frames includes a number of idle bits, said delays corresponding to a number of said idle bits in each of said plurality of frames.

25. A switch in accordance with claim 19, wherein said plurality of input buffer circuits includes programmable first-in-first out (FIFO) buffer circuits.

26. A switch in accordance with claim 22, wherein said plurality of output buffer circuits includes programmable first-in-first out (FIFO) buffer circuits.

27. A communication device, comprising:
a first switching bay having a first input buffer circuit and a second input buffer circuit, a first output buffer circuit and a second output buffer circuit, and a switch matrix circuit coupled to said first and second input buffer circuits and said first and second output buffer circuits;
a second switching bay coupled to said first input buffer circuit and said first output buffer circuit;
a third switching bay coupled to said second input buffer circuit and said second output buffer circuit; and
a control circuit coupled to said first and second input buffer circuits and said first and second output buffer circuits, said first and second input buffer circuits receiving corresponding first and second data transmitted from said second and third switching bays, respectively, said control circuit being configured to measure first and second data skews associated with said transmission of said first and second data, respectively, to said first and second input buffer circuits, and to supply additional data to said second and third switching bays via said first and second output buffer circuits, respectively, with corresponding first and second delays, said first and second delays being in accordance with said first and second data skews, respectively.

28. A communication device in accordance with claim 27, wherein said control circuit monitors said first and second input buffer circuits to determine a point in time when one of said first and second input buffer circuits contains a predetermined amount of said first or second data, said control circuit determining said first and second data skews based on amounts of said first and second data contained in said first and second input buffer circuits, respectively, at said point in time.

29. A communication device in accordance with claim 28, wherein first and second delays are determined based on a difference between one of said first and second data skews and the other of said first second data skews.

30. A communication device in accordance with claim 28, wherein said predetermined amount of said first or second data is an amount of data substantially equal to half of a capacity of said first and second input buffer circuits.

31. A switch in accordance with claim 27, wherein each of said plurality of first and second input buffer circuits and said first and second output buffer circuits includes programmable first-in-first out (FIFO) buffer circuits.

32. A communication device, comprising:
a first bay having:
a first switch stage having a first plurality of input buffer circuits and a first plurality of output buffer circuits coupled to said first plurality of input buffer circuits through a first switch matrix circuit; and
a second switch stage having a second plurality of input buffer circuits coupled to said first plurality of output buffer circuits and a second plurality of output buffer circuits coupled to said second plurality of input buffer circuits through a second switch matrix circuit;
a second bay having:
a first switch stage having a first plurality of input buffer circuits and a first plurality of output buffer circuits coupled to said first plurality of input buffer circuits through a first switch matrix circuit; and
a second switch stage having a second plurality of input buffer circuits coupled to said first plurality of output buffer circuits and a second plurality of output buffer circuits coupled to said second plurality of input buffer circuits through a second switch matrix circuit; and
a control circuit coupled to said first and second bays, said control circuit being configured to measure a plurality of data skews, each of which being associated with a corresponding one of said input buffer circuits of said first stage and second stages of said first and second bays, said control circuit further being configured to determine a plurality of aggregate data skews in accordance with said plurality of data skews, said second plurality of output buffer circuits of said first and second stages of said first and second bays outputting data under control of said control circuit and in accordance with said aggregate data skews.

33. A switch in accordance with claim 32, wherein each of said first pluralities of input and output buffer circuits of said first and second stages of said first and second bays includes programmable first-in-first out (FIFO) buffer circuits.

34. A switch in accordance with claim 33, wherein said control circuit further generates a master synchronization signal common to said first and second stages, said control circuit controlling said output of said plurality of data frames from said first and second pluralities of output buffer circuits of said first and second stages of said first and second bays further in accordance with a comparison of said master synchronization signal and said aggregate skew information.

35. A switch, comprising:
a plurality of input buffers circuits, each of said plurality of input buffer circuits receiving a respective one of a plurality of input data streams, said input buffer circuits accumulating data associated with each of said plurality of input data streams;
a switch fabric circuit coupled to said input buffer circuits; and
a launch control circuit coupled to each of said plurality of input buffer circuits, said launch control circuit being configured to control said plurality of input buffer circuits to supply said data respectively stored therein to said switch fabric circuit based on a control signal, said control signal being applied by said launch control circuit to said plurality of input buffer circuits in accordance with a skew associated with at least one of said plurality of input data streams.

36. A switch in accordance with claim 35, wherein said skew is determined relative to an initial timing of said application of said control signal to said plurality of input buffer circuits.

37. A switch in accordance with claim 35, wherein a timing associated with said application of said control signal to said plurality of input buffer circuits is adjusted by said launch control circuit.

38. A switch in accordance with claim 35, wherein said control signal is applied to said plurality of input buffer circuits via a delay circuit, a timing associated with said application of said control signal to said plurality of input buffer circuit is adjusted by said delay circuit.

39. A switch in accordance with claim 38, wherein said delay circuit includes a memory.

40. A switch in accordance with claim 35, wherein each of said plurality of data streams includes a plurality of contiguous frames.

41. A switch in accordance with claim 40, wherein said frames are devoid of idle bytes.

42. A switch in accordance with claim 40, wherein said data streams conform to a Synchronous Optical Network (SONET) standard.

43. A switch in accordance with claim 35, further comprising a plurality of counters, each of which being coupled to a respective one of said plurality of input buffer circuits and outputting a timing signal corresponding to said skew.

44. A switch in accordance with claim 35, wherein said at least one of said data streams has an associated skew which is greater than data skews associated with the remaining data skews.

45. A communication device, comprising:
a first switch having a plurality of output buffer circuits; and
a second switch having a plurality of input buffer circuits, each of which being configured to be coupled to a respective one of said plurality of output buffer circuits; and a control circuit coupled to said first and second switches, said control circuit adjusting an output timing of data from said output buffer circuits to said input buffer circuits in accordance with at least one of a plurality of skew values associated with said data.

46. A communication device in accordance with claim 45, further comprising:
a plurality of counter circuits, each of which being coupled to a respective one of said plurality of input buffer circuits and outputting a corresponding one of a plurality of timing values based on an amount of data contained in said respective one of said plurality of input buffer circuits; and
a launch signal generating circuit coupled to plurality of input buffer circuits, said input buffer circuits outputting said data in response to said launch signal, said plurality of skew values corresponding to differences between said timing values and said a timing associated with said launch signal.

47. A communication device in accordance with claim 45, wherein said plurality of skew values correspond to differences between said arrival times of said data from and output buffer circuits and a reference clock signal.

48. A communication device in accordance with claim 45, wherein said at least one of said plurality of skew values has a higher skew value than remaining ones of said plurality of skew values.

49. A switch in accordance with claim 45, wherein said data includes a plurality of contiguous frames.

50. A switch in accordance with claim 49, wherein each of said plurality of frames is devoid of idle bytes.

51. A switch in accordance with claim 49, wherein said data conforms to a Synchronous Optical Network (SONET) standard.

* * * * *